United States Patent
Jovin et al.

[11] Patent Number: 6,128,077
[45] Date of Patent: Oct. 3, 2000

[54] CONFOCAL SPECTROSCOPY SYSTEM AND METHOD

[76] Inventors: Thomas M. Jovin, Zur Akelei 17, D-37077 Göttingen; Quentin Hanley, Stumpfebiel 6, D-37073 Göttingen; Peter Verveer, Lange Geismarstrasse 40, D-37073 Göttingen, all of Germany

[21] Appl. No.: 09/193,692

[22] Filed: Nov. 17, 1998

[30] Foreign Application Priority Data

Nov. 17, 1997 [DE] Germany ............................. 97120101

[51] Int. Cl.⁷ ......................................................... G01J 3/28
[52] U.S. Cl. ............................................ 356/310; 356/330
[58] Field of Search ................................... 356/310, 330, 356/326, 328; 359/310, 341

[56] References Cited

U.S. PATENT DOCUMENTS

| | | |
|---|---|---|
| 4,856,897 | 8/1989 | Fateley et al. . |
| 5,065,008 | 11/1991 | Hakamata et al. . |
| 5,090,807 | 2/1992 | Tai . |
| 5,121,239 | 6/1992 | Post . |
| 5,192,980 | 3/1993 | Dixon et al. . |
| 5,221,959 | 6/1993 | Ohyama et al. . |
| 5,504,575 | 4/1996 | Stafford ................................. 356/330 |

FOREIGN PATENT DOCUMENTS

| | | |
|---|---|---|
| 0 327 425 | 8/1989 | European Pat. Off. . |
| 0 508 257 A2 | 10/1992 | European Pat. Off. . |
| 0 697 288 A2 | 2/1996 | European Pat. Off. . |
| 2 299 235 | 9/1996 | United Kingdom . |
| 97/31282 | 8/1997 | WIPO . |
| 98/00689 | 1/1998 | WIPO . |

OTHER PUBLICATIONS

IBM Technical Disclosure Document, "Electronically Scanned Confocal Imaging System," vol. 36, No. 06B, Jun. 1993, Armonk, New York, US.

Enomoto Hirofumi, "Device for Generating Light Having Optional Spectral Distribution"; publication No. 03150528; publication date Jun. 26, 1991; Patent Abstracts of Japan, vol. 015, No. 380, Sep. 25, 1991.

*Primary Examiner*—Frank G. Font
*Assistant Examiner*—Layla Lauchman
*Attorney, Agent, or Firm*—Duane Morris & Heckscher LLP

[57] ABSTRACT

A confocal spectral imaging system comprises a light source, a light modulator forming an illumination aperture and directing an illumination pattern to conjugate object locations, and analyzing means with a detection aperture, dispersive elements and a detector, wherein the illumination and detection apertures are in conjugate optical planes, and the light modulator consist of an array of light modulator elements, a group of which being arranged according to the illumination pattern and forming the illumination aperture, and are controlled such that the illumination pattern is directed to time-dependent changing conjugate locations of the object. A programmable light source comprises a white light source, dispersion means and a spatial light modulator with an array of individually time-dependent controllable modulator elements being illuminated with the dispersed light and providing a position selective transmittivity or reflectivity, so that a light with a predetermined wavelength distribution passes the light modulator.

29 Claims, 8 Drawing Sheets

Slit Position     Wavelength (nm)     Wavelength (nm)

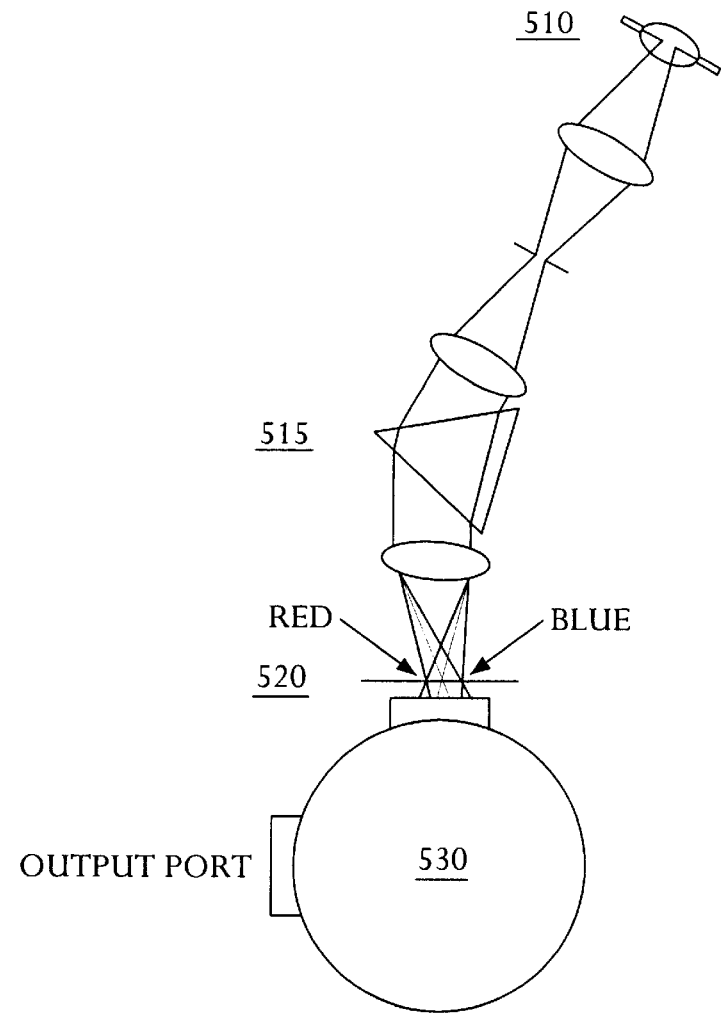
FIG. 5
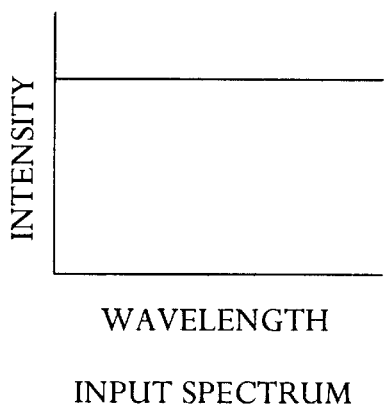
WAVELENGTH
INPUT SPECTRUM
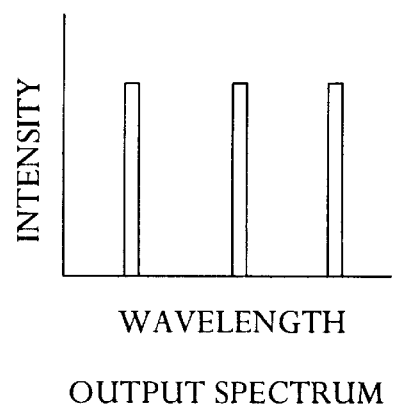
WAVELENGTH
OUTPUT SPECTRUM

CONFOCAL SPECTROSCOPY SYSTEM AND METHOD

BACKGROUND OF THE INVENTION

The invention generally relates to a confocal spectroscopic imaging system (CSIS) employing a confocal spectroscopic system (CSS) and/or a wavelength progammable light source (PLS). The components CSS and PLS can be used separately or together to create the CSIS. The invention particularly relates to a preferred implementation of the CSIS with a programmable array microscope (PAM) in which the patterns of illumination and detection are freely programmable.

Confocal microscopy based on point scanning systems with conjugate pairs of illumination and detection apertures is an effective tool for imaging a microscopic object to be investigated with direct optical sectioning. The discrete aperture spots are illuminated in the object plane of the microscope from which reflected or fluorescent light is observed through the conjugate detection apertures in an image plane. Commonly used confocal microscopes based on scanning systems with mechanically translated aperture disks (so-called Nipkow disks with a plurality of apertures) or with rotating mirrors being adapted to scan an object with a laser beam (Confocal Laser Scanning Microscopy, CSLM). Disk-based scanning systems have limitations as to a restriction of the illumination field, a degraded contrast and high intensity losses. Typically less than 3% of the aperture disk is transmissive since the spacing between the pinholes must be large to maintain the confocal effect. On the other hand, the CSLM suffers from a low duty cycle imposed by the sequential single point mode of data acquisition.

A modified spatially light modulated microscope has been described by M. Liang et al. in "Optics Letters" (vol. 22, 1997, p. 751–753) and in the corresponding U.S. Pat. No. 5,587,832. A two-dimensional spatial light modulator is formed by a digital micromirror device (in the following: "DMD") which reflects illumination light from a source (laser or white light source) to a probe and detection light from the probe to a two-dimensional detector. Each micromirror of the DMD is individually controlled so as to form an illumination and detection spot or not.

A general disadvantage of the prior art confocal microscopes concerns the detection of spectrally resolved images. The duty cycles and the illumination and detection intensities are limited so that a spectral imaging is not possible within practically interesting measuring times. Furthermore, excitation sources with rapid selection of large numbers (>50) of multiplexed spectral elements at kHz-frequencies are not available.

Hadamard transform spectrometers (in the following: "HTS") are known which provide a positional and spectral selectivity on the basis of a detection through a so-called Hadamard encoding mask. Such spectrometers are described e. g. by R. M. Hammaker et al. in "Journal of Molecular Structure" (vol. 348, 1995, p. 135–138) or by P. J. Treado et al. in "Applied Spectroscopy" (vol. 44, 1990, p. 1–5, vol. 44, 1990, p. 1270–1275).

A Hadamard transform Raman microscope according to P. J. Treado et al. is shown in FIGS. 7A,B as HTS 70. FIG. 7A shows the arrangement of a Hadamard mask 72 in the detection path of a microscope 71. The Hadamard mask 72 is a linear encoding mask, and a spatial multiplexing of spectral measurments is obtained by driving the mask with a translation stage 73. The image obtained with the spectrograph 74 is decoded with a control computer 75. Details of the conventional microscope 71 used in the HTS 70 are shown in FIG. 7B.

The HTS according to P. J. Treado et al. has the following disadvantages. The illumination is restricted to a certain excitation wavelength without any controllability. The arrangement allows only Raman measurements. Because of the use of a conventional microscope, the generation of optical sections of an object under investigation without image processing is impossible. The mask is a non-programmable light modulator only.

Accordingly, the application of known HTS is generally restricted to optical detection paths or to acousto-optical measurements, Raman microscopy and conventional microscopy.

A confocal Raman microspectroscopy system is described by G. J. Puppels et al. in "Nature" (vol. 347, 1990, p. 301–303). Light scattered by an object under investigation is collected by an objective and coupled through a pinhole for confocal detection into a spectrometer. The detection through a pinhole represents an essential limitation of the measured light intensity so that the applicability of the known microspectroscopy system is restricted.

Confocal line scanning systems are commonly known. The work of P. A. Benedetti et al. in "Journal of Microscopy" (vol. 165, 1992, p. 119–129) discloses the use of a spectroscopic system with the confocal-line (CL) method. The CL technique has the following disadvantages. First, the formation of the line-shaped illumination needs extended optical components (slits, lenses, mirrors) with strict adjustment requirements. Second, the optical components are fixedly positioned, so that the scanning perpendicular to the line direction has to be performed by a mechanical object scanning table. Accordingly, the scanning speed is strongly restricted and particularly the spectral imaging is time consuming. Third, the illumination in this CL system is restricted to the use of one slit only. An operation with a multiplexing in a spatial domain is impossible.

Real-time confocal microscopy or imaging, in particular in the field of imaging biological objects like cells or parts thereof, calls for further improvements with regard to high contrast, sensitivity, detection speed and for an extended applicability of spectral imaging.

SUMMARY OF THE INVENTION

It is the object of the present invention to provide an improved device and method for confocal spectral imaging allowing rapid data acquisition, in particular with effective optical sectioning, high spatial resolution, high optical efficiency and spectral resolution. It is a particular object of the invention to provide rapid imaging of biological or chemical materials (e. g. living cells, reaction composites etc.) while exploiting the ability of spectroscopic measurements and thus information about molecular structure and function. Due to its inherent sensitivity and selectivity, molecular fluorescence is a preferred spectroscopic phenomenon to be implemented with the new imaging device and method. It is a further object of the invention to provide a programmable light source adapted to generate a light output with a wavelength or wavelengths rapidly selectable according to a predetermined sequence.

The above object is solved by a confocal imaging device or method or by a light source comprising the features of claim 1, 11 or 18, respectively. Advantageous embodiments of the invention are defined in the dependent claims.

The basic idea of the inventors is the operation of a confocal optical imaging system having spectroscopic analyzing means with spatial light modulator means (in the following: SLM). The SLM means have an array of light modulator elements. One array can be a mask consisting of modulator elements each of which is individually controllable. The controllability relates to optical features of the elements, as transmission, reflection or diffraction. A changing group or all of the modulator elements form an coding illumination pattern as an illumination and/or detection aperture. The patterns for illumination and detection matched to each other are generated separately or by a common modulator. The modulator elements representing the actual aperture are selectable according to a predetermined pattern sequence, so that an illumination pattern sequence is formed in the conjugate object plane and changing locations are illuminated. The illumination pattern sequence allows a time encoded illumination. Accordingly, the SLM means form an illumination and/or detection coding means. With a modified version, the array can be a movable mask and the sequence is obtained from a mask movement. In this case, an imaging spectrograph is placed in the conjugate image plane of the microscope and multiple apertures of the mask are used for collecting the light. The system can contain a further array of light modulator elements being the mask of a spectrally programmable illumination source described below.

The illumination pattern sequence comprises a systematically shifting line or lines either spaced regularly, according to a pseudo-random sequence of finite length, according to a S-matrix type Hadamard sequence or randomly; regular dot lattices as e. g. triangles, squares, rectangles, hexagons; random patterns or pseudo-random patterns of finite length based on so-called Walsch, Sylvester, Hadamard or Golay sequences; square or rectangular grids formed from intersecting line patterns; plane filling patterns being adapted to turn on the SLM elements an integral number of times when sequentially produced on the SLM; or a combination of the above pattern sequences on the basis of logic Boolean AND, OR, NAND, NOR or XOR operations.

According to preferred embodiments, the detection aperture coincides with the illumination aperture and/or forms the entrance of spectrally dispersive elements of the analyzing means. When the entrance of the spectrally dispersive elements and a two-dimensional detector camera are arranged in conjugate optical planes, the provision of an entrance slit can be omitted.

Preferably, the confocal spectroscopy system of the invention is implemented with a PAM as described in the European patent application No. 97118354.6 filed on Oct. 22, 1997, the complete contents of which is included to the present specification by reference.

Light source means of the system contain a white light lamp with a fixed or tunable wavelength filter or a laser. A white light lamp with a tunable wavelength filter is obtainable in particular from a spectrally programmable illumination source being an independent subject of the invention. In this case, the wavelength filter comprises a spectrally dispersive element and a two-dimensional array of light modulator elements being adapted to select at least one of the predetermined wavelengths passed through the dispersive element.

According to preferred applications of the invention, the detection light is fluorescence, phosphorescence, reflected or Raman scattered light emitted from the object.

The confocal spectral imaging method of the invention comprises the steps of focusing illumination light from light source means via a light modulator means with an array of light modulator elements forming an illumination pattern in conjugate locations to an object under investigation and collecting light emitted from the object with analyzing means with a detection aperture, spectrally dispersive elements and a two-dimensional detector camera, wherein the illumination aperture and the detection aperture are placed in conjugate optical planes and wherein the light modulator means are controlled in a time-dependent fashion such that a group of modulator elements shaped according to a predetermined aperture or pattern forms an illumination pattern sequence. For the collection of a two-dimensional optically sectioning image, the pattern sequence is used as featured above. The time-dependent control is adapted to provide a scanning of the object plane for collecting the two-dimensional image as an optical section.

Preferably, the spectral imaging is implemented in using a programmable array microscope as described in the European patent application No. 97118354.6 filed Oct. 22, 1997 to create confocal arrangement of illumination and detection apertures. In this preferred arrangement, two complete spectral images are recorded corresponding to the conjugate $I_c$ and non-conjugate $I_{nc}$ images outlined in the above mentioned application. A deconvolution step can then be applied to the acquired images to reduce blurring in one or more optical sections. The implementation of the blurring matrix is given with a further spectral or time dimension.

Advantageous applications of the invention comprise methods of simultaneous position selective initiating and monitoring photochemical reactions on a substrate, wherein the initiating includes the irradiation of predetermined substances with a suitable wavelength (e. g. with a programmable light source as described below) and the monitoring includes fluorescence measurements with the substances or the reaction products; investigations in the cell and tissue biology; analytical/biotechnological procedures, in-situ hybridization in genetic analysis; the formation of an optical mask for position selective photochemical reactions; position selective fluorescence measurements including excitation and emission spectra of one or more intrinsic or external fluorophores, lifetime measurements and/or polarization measurements; readout of biochemical arrays on chips; large scale surface inspections in the semiconductor industry, and/or optical recording and read-out.

The invention has the following advantages. First, the sectioning of samples combined with spectroscopy gives a better indication of the spectra present at a particular position in a sample. In biology this will give better discrimination of co-localized structures. Second, the invention allows for selective photochemistry with detection of the products in a confocal mode. Third, the invention allows the ability to do spectrally resolved lifetime measurements if combined with a phase modulation or time correlation techniques. The imaging allows a spectral discrimination against auto-fluorescence and other interfering signal sources. The invention allows a combination with 2- or multi-photon excitation in fluorescence measurements and with stereoscopic imaging.

BRIEF DESCRIPTION OF THE DRAWINGS

Further details and advantages of the invention are described in the following with reference to the attached drawings which show in:

FIG. 5: a schematic view of a programmable light source according to the invention;

In the following, two separate aspects of the invention concerning the spectral imaging and the programmable light source are described. With regard to the application of a system according to the invention, the steps of object handling, image processing and displaying are not described in detail as far as they are known from common confocal scanning devices.

DETAILED DESCRIPTION OF THE PREFERRED EMBODIMENTS

The confocal spectroscopic system (CSS) with spectral imaging according to the invention can be implemented on the basis of SLMs being operated in transmission (e. g. programmable aperture masks on the basis of liquid crystals or micromechanical switches), in reflection (e. g. DMD), with diffraction, or with lithographically etched modulators. The CSS contains a spatial light modulator which is placed in the image plane of the microscope. A group or all of the elements of the spatial light modulator each of which are conjugate to a distinct point in the focal plane of the microscope objective, represent an illumination aperture and define a programmable array which may be used for illumination and/or detection. The position of the programmable array with regard to the optical axis of the illumination path is changed according to an individual control of each of the modulator elements or according to a physical movement of a modulator with a fixed pattern. According to a particular embodiment of the invention, the CSS contains another spatial light modulator being a wavelength selective device adapted to illuminate the above first light modulator as a part of a light source as described below.

Figure 1:
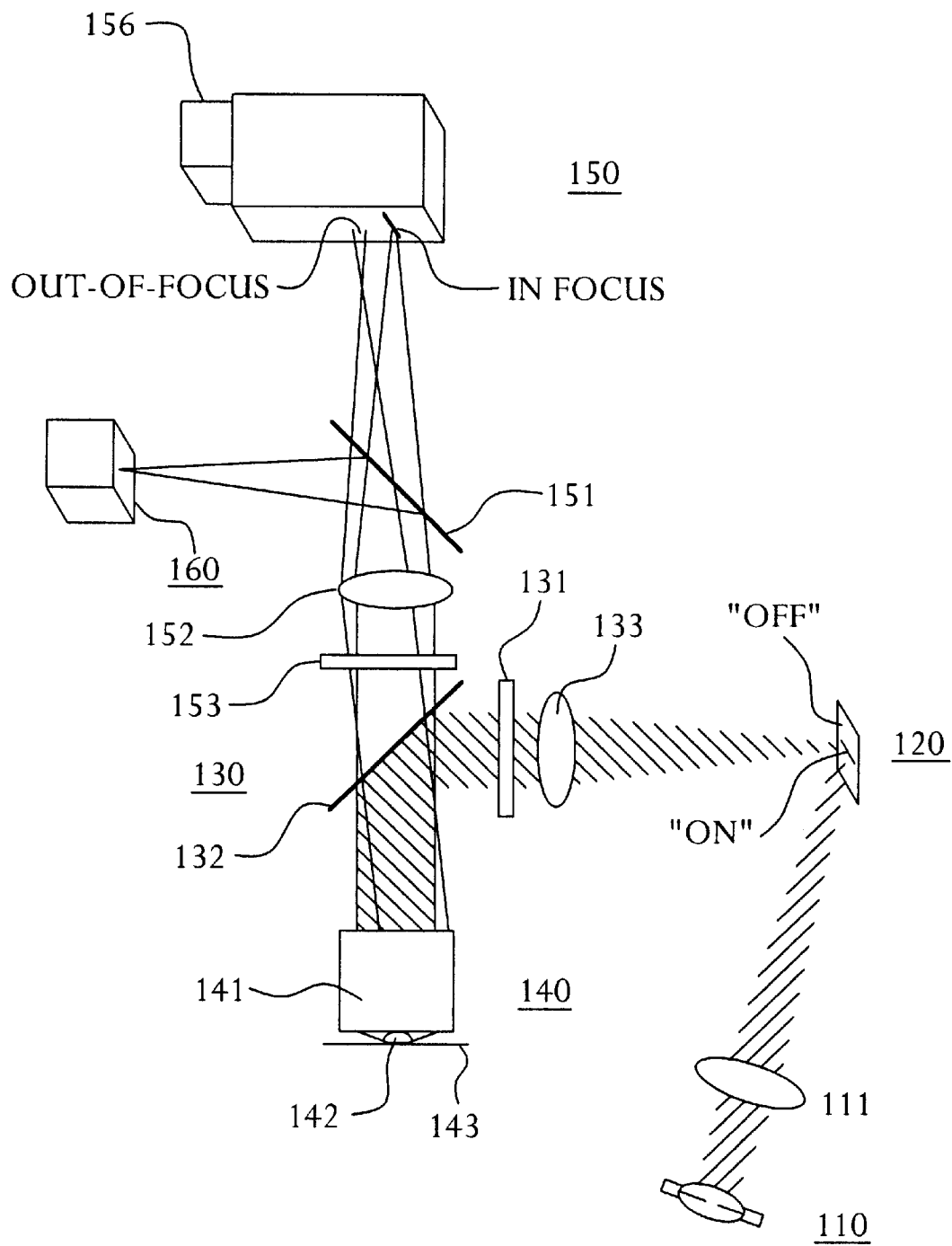
FIG. 1: a schematic view of a first embodiment of a spectral imaging CSIS according to the invention consisting of a CSS only.

The CSIS 100 of FIG. 1 representing an implementation of the invention in a microscope using a spatial light modulator 120. It contains an optional two dimensional camera system 160 for integrating it into a PAM. This CSIS is a dual path single reflection design. The "dual path" refers to the fact that illumination and detection follow two separate optical paths. Further, only a single reflection direction of the reflective SLM is used. An alternative arrangement is a common path double reflection design shown in FIG. 4. The CSIS 100 basically includes light source means 110 which is a white lamp as shown (with an excitation wavelength selection means) or a source with fixed or tunable wavelengths like a laser source or a programmable illumination source described below, a DMD 120 operating as a SLM being arranged in an image plane of the microscope, imaging optics 130, a probe portion 140, analyzing means 150 and a full field detection means 160.

The DMD 120 consists of an array of square mirrors each of which can be separately tilted into two stable resting states over a predetermined tilt angle $\pm\alpha$ to the normal. The value of the tilt angle 60 depends on the DMD practically used. Each mirror element has a predetermined area which again depends on the DMD. Preferred parameters are e. g. $\alpha=\pm10°$ with <20 µm square mirrors. Each mirror element can be switched between the resting states with characteristic frequencies in the kHz-range according to a predetermined modulation pattern. The resting states are called "on"- and "off"-positions according to the respective pattern (e.g. line) shape contributions ("on") focused to conjugate positions of the object and the remaining illumination light ("off").

The DMD 120 is illuminated with the light source means 110 via a lens 111. The excitation filter 131 can be a bandpass for a predetermined wavelength range of interest. For the detection of excitation spectra, the bandpass can be implemented by a variable dispersive element. The reflections from the "on"-elements are focused via the first beam splitter 132 (semitransmissive mirror) and the objective 141 into the object plane of the object 142. The beam splitter 132 can include a dichroic mirror. Fluorescence or scattered light stimulated in the object plane returns through the objective 141 to the first beam splitter 132 where it passes along the optical axis via a filter 153, a tube lens 152 and a second beam splitter 151 to the analyzing means 150. The confocal arrangement allows to reject light from the non-conjugate positions of the object. The filter 153 is preferably a long pass filter being adapted for the fluorescence, phosphorescence or Raman scattering measurement ($\lambda_{em}>\lambda_0$). In the analyzing means 150, the detection light is collected and the obtained image signals are processed for image or optical section reconstruction.

CSIS 100 can be implemented with a Digital Light Processing kit (e. g. of Texas Instruments, Dallas, USA) as a light source in combination with a microscope with side illumination ports (e. g. Zeiss Axioplan) and a camera module with a CCD camera (e. g. CH220 camera of Photometrics, Tucson, USA, with Kodak KAF1400 CCD sensors). The spectrograph 154 of the analyzing means 150 is any conventional spectrograph as e. g. a SpectraPro-150 imaging spectrograph with a 300 lines/mm grating, Acton Research Corp., Acton, USA, and a SBIG ST-6 camera, Santa Barbara Instruments Group, Santa Barbara, USA. The entrance slit is adapted to the line width generated with the DMD 120, e. g. according to the above example the slit is set to 25 µm. The probe portion 140 contains a driving device 143 for z-displacements (perpendicular to the focus plane) like a computerized focus control e. g. of Ludl Electronics Products, Hawthorne, USA. The objective is e. g. a 40×1.3 NA oil immersion objective. Each system of the invention (e. g. the CSIS 100) additionally contains a driving unit for controlling the modulator elements or a movable mask, a control unit, calculation, decoding and/or deconvolution circuits and display units (not shown). The illumination path is shown with a hatched area. The control unit is particularly adapted to collect camera signals in synchronization with the control of the modulator elements.

For confocal spectral imaging, a moving pattern sequence is written to the DMD 120 causing light from the corresponding mirrors to be collected with the illumination tube lens 133 and directed through the filter 131. For obtaining a complete two-dimensional image of the object, the pattern is to be scanned, e. g. each of the modulator elements is to be controlled separately such that the position of the pattern changes according to a predetermined pattern sequence. The DMD 120 is controlled as described above e. g. such that the object to be investigated is illuminated e. g. with a line pattern of SLM elements. This situation is called line confocal operation in which the line of pixels in the SLM conjugate to the entrance slit of the spectrograph are turned "on". With a DMD mirror element width of about 16 µm and a 40× objective, the illumination line imaged to the object has a width of about 400 nm. This line is placed conjugate to the entrance slit of the analyzing means.

The imaging pattern sequence generally may comprise a fixed or systematically shifting line or lines either spaced regularly, according to a pseudo-random sequence of finite length, according to a S-matrix type Hadamard sequence or randomly, regular dot lattices as e. g. triangles, squares, rectangles, hexagons, random patterns or pseudo-random patterns of finite length based on so-called Walsch, Sylvester, Hadamard or Golay sequences. Sylvester matrices are preferred encoding sequences due to the ability to multiplex one spatial domain allowing a two dimensional detector to record three dimensions of data. This improves the SNR of the measurements in many cases. The line imaging (confocal slit illumination) is preferred due to the adaptation to the shape of the entrance aperture of commonly used spectrographs.

In the example, a demagnified image of the line is formed by the objective 141 in the object plane where the fluorescence is stimulated or the light is scattered. The emitted light forms a line image at the entrance slit 155 of the imaging spectrograph 154. Confocal (in-focus) light passes through the slit 155 which is recorded with the one- or two-dimensional camera 156. The further processing of the collected image corresponds to known decoding and reconstruction procedures.

For full field imaging, the entire DMD 120 is turned to the "on"-position. For spectral imaging, the optical path is similar except that the light passing through the entrance slit 155 contains a greater amount of out-of-focus light from structures above and below the object plane. For non-spectral imaging, the full field additionally is recorded with the detecting means 160 containing a two-dimensional camera 161. The second camera 161 collects the full field image via the second beam splitter 151. This allows the direct comparison between confocal and conventional operation modes at identical probe positions. The camera 161 can particularly be used in a so-called single camera mode as described in the copending European patent application No. 97118354.6 filed on Oct. 22, 1997 so that a conventional and a confocal image are obtained alternately.

Furthermore, excitation spectra can be obtained by arranging a wavelength selector in the optical path between the light source and the SLM. According to an alternative application, absorption spectra in a reflection mode are collected. The SLM is preferably controlled with a coding sequence according to the Hadamard sequences as cited above. Accordingly, the Hadamard sequences are used for the first time for both the illumination and the detection simultaneously.

FIGS. 2a–f show examples of spectral images obtained with an arrangement according to FIG. 1. For print technical reasons, colored photographs are shown only schematically.

Figures 2A, 2B, 2C:
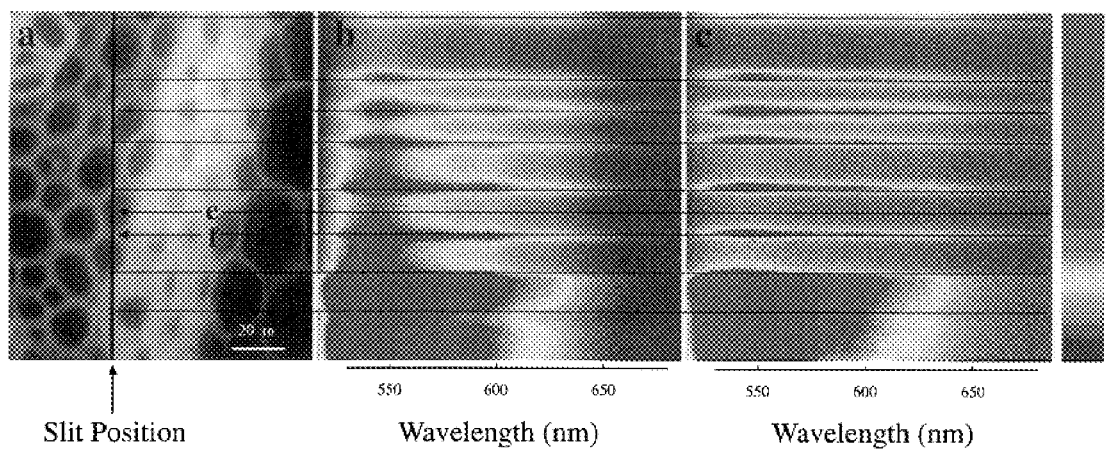
FIGS. 2a to 2f: illustrations of spectrally resolved measurements obtained with the arrangement of FIG. 1.

FIG. 2a shows an example of a fluorescently labelled biological specimen. A 15 μm section of Convallaria rhizome having a high spatial frequency structure was stained with acridine orange. Upon excitation at 450–490 nm, the fluorescence is emitted in two spectral regions yellow and red which have different gray values in the figure. The arrow of FIG. 2a indicates the position of the entrance slit. The horizontal lines refer to the corresponding spectra in FIGS. 2b, 2c. FIG. 2b shows a full field (conventional) spectral line image from the slit position in FIG. 2a. The schematical drawing shows the fluorescence maximum in the red range which is dominant in the lower part of the figure according to the corresponding structure in the probe. In the middle and upper parts of the figure, the red fluorescence overlaps to geometrical ranges where changed spectral properties are expected on the basis of FIG. 2a. This overlapping represents a reduced resolution of the conventional imaging.

FIG. 2c shows a confocal spectral image of the same slit position as in FIG. 2b. In the upper part of the figure, the regions with red fluorescence according to red emitting structures crossed by the horizontal lines in FIG. 2A are clearly separated from the low emitting "shadows" in FIG. 2a. The overlapping as in FIG. 2b is completely avoided. This represents an essential advantage of the invention as to the improved contrast and spectral purity of the images.

Figure 2D:
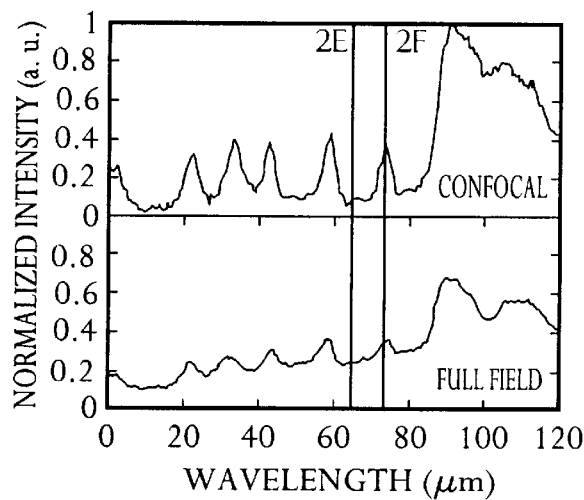

FIG. 2d shows the comparison of the intensity distribution along the slit axis at 540 nm (normalized to the total light collected) for confocal (above) and full field imaging (below). According to the structure in FIG. 2a, the stronger fluorescing elements yield maxima in the intensity curves. The confocal image in FIG. 2d shows an improved background rejection compared with the full field image.

Figure 2E:
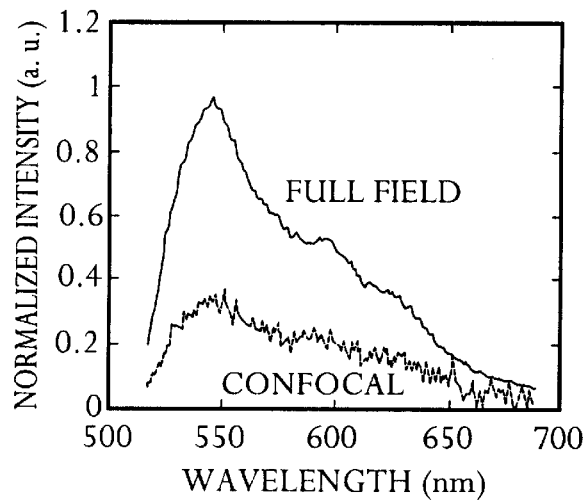
Figure 2F:
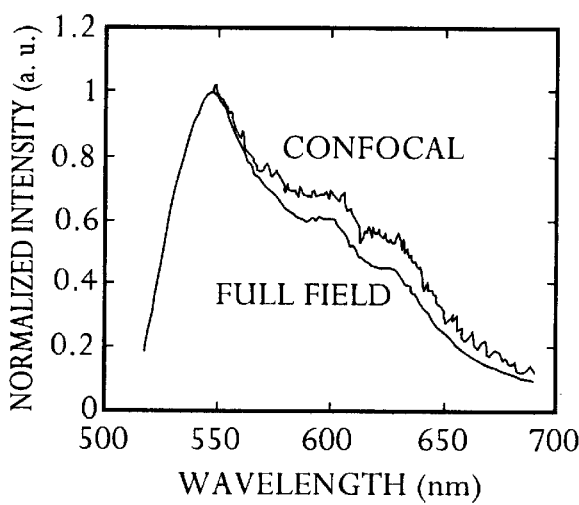

The fluorescence spectra of FIGS. 2e and 2f are taken at the respective positions e, f indicated in FIG. 2a. The spectra are uncorrected with regard to the quantum efficiency of the detector. FIG. 2e (normalized as in FIG. 2d) corresponds to the "dark" structure e in FIG. 2a. The conventional spectrum shows a relative strong fluorescence caused by emissions around the structure e. On the other hand, the confocal spectrum is suppressed as the interfering emissions are avoided. This result yields a background suppression by a factor of about 3. FIG. 2f (normalized to the intensity of 546 nm) shows a spectrum corresponding to the structure f in FIG. 2a. The spectrum is shifted to the red in the confocal case due to the less interference from the adjacent yellow structure.

Figure 3:
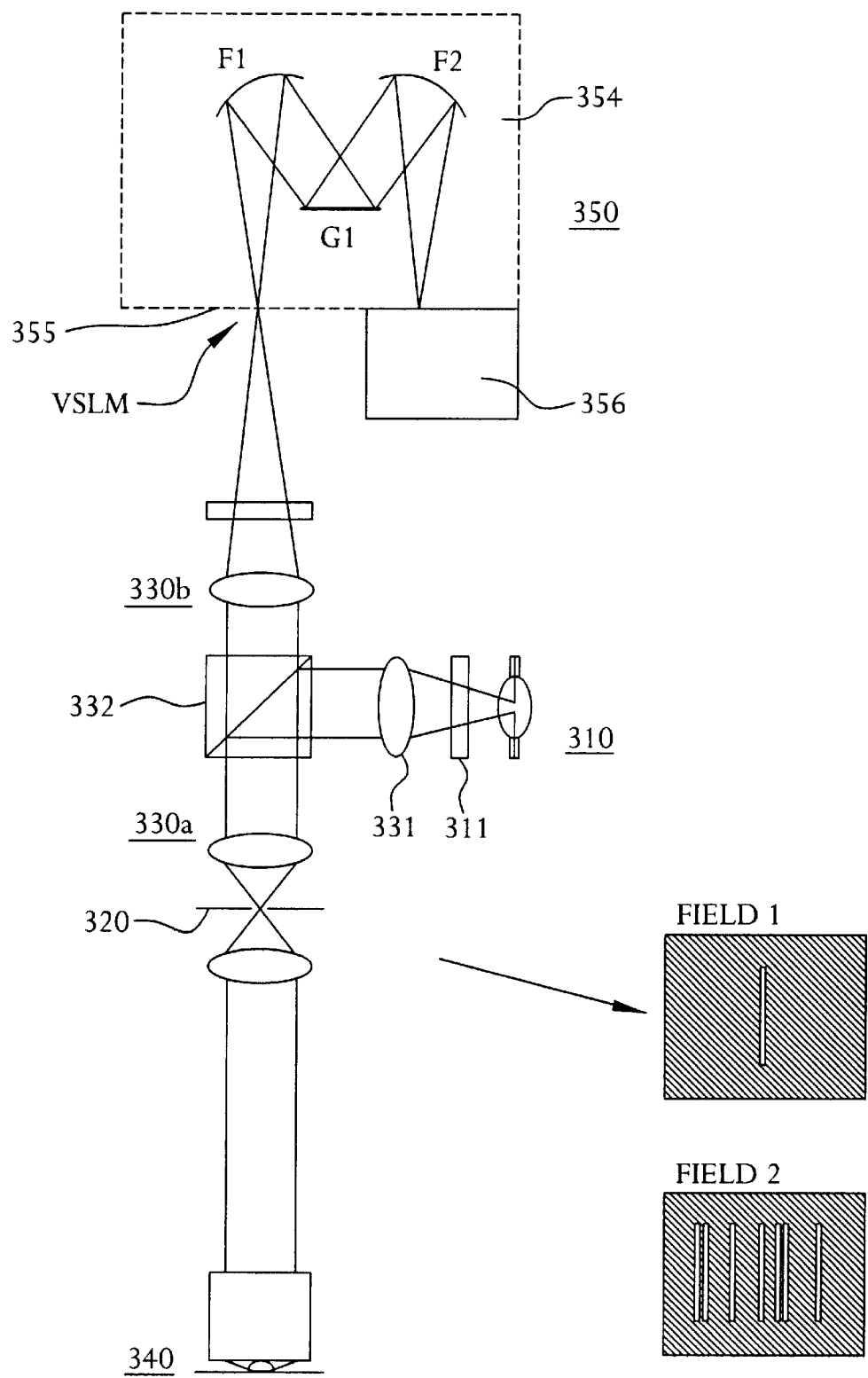
FIG. 3: a schematic view of second embodiment of a spectral imaging CSIS according to the invention.

FIG. 3 shows another embodiment of a microscope having an integrated confocal illuminator and spectrograph. The CSIS 300 represents an integrated confocal illuminator and spectrograph.

On the optical axis of the CSIS 300 a probe portion 340, imaging optics 330a and 330b and analyzing means 350 with an imaging spectrograph 354 are arranged. The optics 330b is an anamorphic system for coupling the light into the entrance of the spectrograph. The anamorphic system contains a component, e. g. a cylindrical lens, to selectively demagnify (compress) a single optical axis. Contrary to the embodiment of FIG. 1, also the SLM 320 is arranged axially defining simultaneously the illumination pattern (illumination aperture) and the entrance slit (detection aperture) of the analyzing means 350. The traditional slits of the imaging spectrograph 354 are removed or, alternatively, opened sufficiently to allow a virtual image of the SLM 320 to be reproduced at the entrance plane 355 indicated in the figure with VSLM ("virtual image of SLM").

The illumination light from the light source means 310 is directed via an excitation filter 311 and an illumination lens 331 through a side port of the microscope and a beam splitter 332 (e. g. half-silvered mirror) to the SLM 320. The SLM 320 is a transmissive device wherein each element is controllable to change the transmittivity for passing the illumination light and, after excitation of the probe, the detection light which passes through the imaging optics 330 (including a tube lens and an emission filter) to the entrance plane 355 of the spectrograph 354 with the detector camera 356. The spectrograph 354 is illustrated with the Fastie-Ebert design having focusing mirrors F1, F2 and a grating G1, however a wide range of other dispersive arrangements including prisms, holographic gratings or acousto-optical tunable filters (AOTF's). The dashed line defines the boundaries of the spectrograph.

The imaging procedure is conducted as described above for the first embodiment. In particular, the SLM 320 is controlled e. g. such that the object to be investigated is illuminated with a line pattern of SLM elements or any other appropriate illumination pattern.

The arrangement of FIG. 3 can be modified by providing a second camera for forming a full field imaging leg as in FIG. 1. Furthermore, the filters can be replaced by AOTF's. The SLM pattern can be selected in any form as described above. The beam splitter 332 can include a dichroic mirror.

The SLM 320 can be a mask with a fixed pattern produced with lithographically etching or with a photographic film. The encoding mask used for both illumination and detection is combined with a support adapted to physically move or translate the mask to generate a series of patterns needed for spectral imaging. In the simplest case the pattern could be a line pattern as shown in the upper inset "field 1" that is shifted sequentially. Alternatively, an encoding set of patterns (e. g. lines or apertures or more complicated patterns) are formed on the mask as shown in the lower inset "field 2". "Field 2" shows a "stylized" pattern approximating a Hadamard pattern. In this case, after the data are collected, a Hadamard transformation can be applied to the data and the image recovered.

Figure 4:
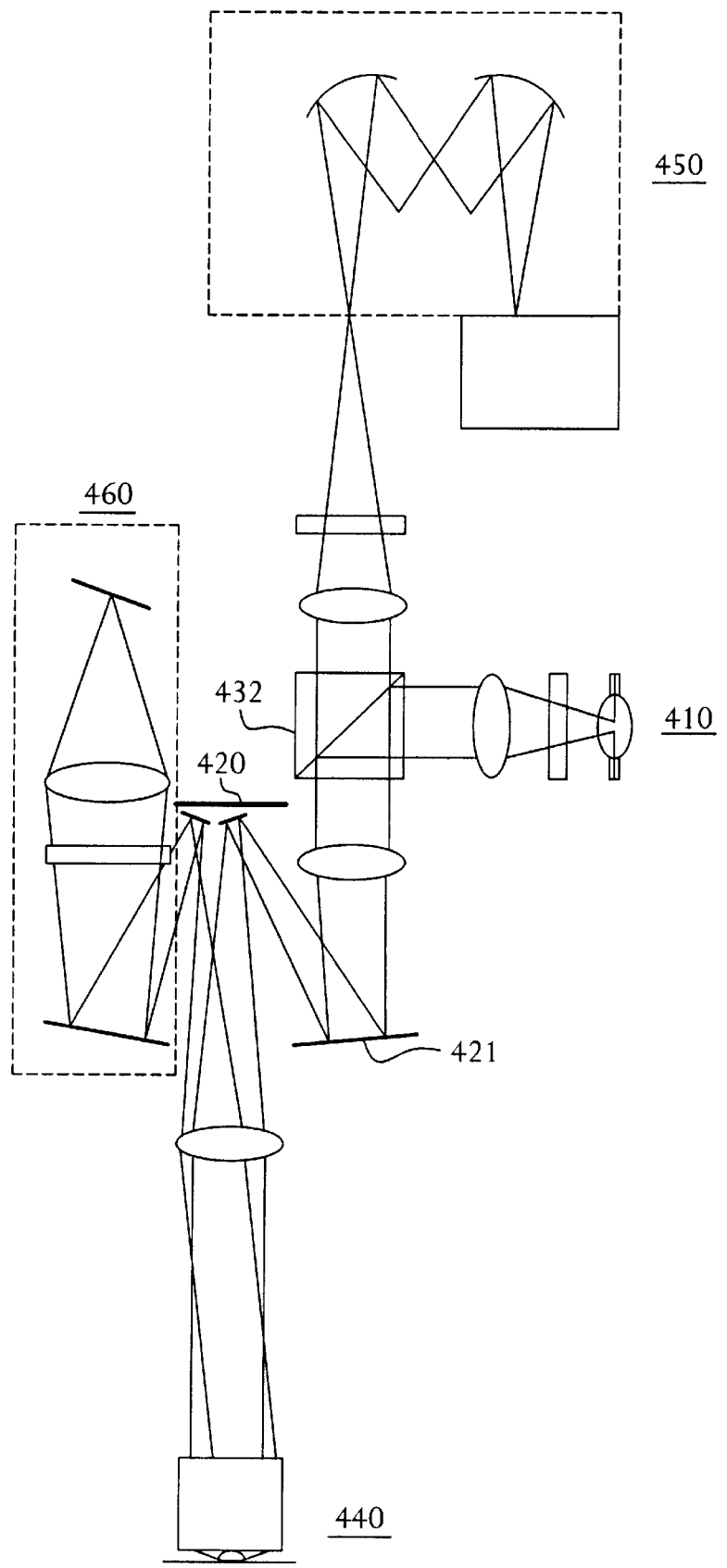
FIG. 4: a schematic view of third embodiment of a spectral imaging CSIS according to the invention.

A microscope 400 comprising similar components as the above embodiments but having a common path double reflection design is shown in FIG. 4. Illumination light from the light source means 410 is directed via the beam splitter 432 and a mirror 421 to the DMD 420 being controlled as described above. The DMD 420 illuminates the object and reflects emitted detection light back to the analyzing means 450. Additionally to the spectroscopy leg of the CSIS 400, a so-called imaging leg 460 can be arranged which comprises components for conventional and/or confocal imaging of the object under investigation. The imaging can be performed as described in the copending European patent application No. 97118354.6 filed on Oct. 22, 1997 the contents of which is included to the present specification by reference.

Spectrally Programmable Light Source (PLS)

Another subject of the invention is the provision of a spectrally programmable light source (PLS) being adapted for rapid spectral shaping of an incident light. This PLS allows an advantageous combination with the above confocal spectral imaging technique as well as general applications in all fields of illumination for measurement or display purposes. A preferred application is the measurement of high throughput excitation spectra by modulating the spectrum leaving the PLS according to a Hadamard sequence. Another preferred application is the use of a PLS as a component (light source means) in a confocal spectroscopy system described above (see FIG. 6).

The PLS comprises a white or broad band light source, focusing optics, a dispersion element, a spatial light modulator and a device for recombining the dispersed wavelengths. A schematic illustration of such a system is shown in FIG. 5. The light source 510 is dispersed with the dispersion element 515 (prism or grating arrangement or similar spectrograph arrangements) over the surface of a spatial light modulator as described above. Prism optics have the advantage of an increased optical efficiency.

The spatial light modulator (structured as described above) is a transmission modulator 520 with individually controllable modulator elements. However a corresponding reflection or diffraction arrangement is also possible. According to the position selective transmissivity of the transmission modulator 520 (formation of "windows" with a certain outer shape), particular wavelengths pass through the modulator e. g. to a device for recombining the transmitted rays or directly to a probe. The outer shape of the selective transmissivity of the modulator (e. g. a slit shape) can be adapted to the shape of the light output from the dispersion element (e. g. a slit). The modulator elements are controlled such that groups of modulator elements are transmissive or reflective and/or absorbing simultaneously which form an outer shape corresponding to the shape of the light output. If this shape is e. g. a slit or line shape, the modulator elements are patterned accordingly as a line. The modulator can be controlled in a dynamic manner, so that the wavelength specific modulator output changes its wavelength characteristic according to a predetermined time pattern with high rates.

In the illustrated case, the device 530 for recombining is an integrating sphere. Other alternatives are arrangements collecting the light with a lens system and using it for the illumination in parallel mode (Kohler type illumination), using a matching set of dispersion optics as used by Tillota et al. in "Applied spectroscopy", vol. 41, 1987, p. 727–734, using fiber optics or liquid light conduits or using scattering surfaces (ground glass).

The device for recombining can be omitted so that the light passing through the modulator illuminates a probe with a complex shifting pattern with different wavelengths. Preferably, the modulator elements are controlled such that the transmission or reflection pattern corresponds to rows or columns of an S-type Hadamard coding matrix. Alternatively, the modulator elements are controlled such that the output wavelengths follow a predetermined time sweep, e. g. a time sweep according to a linear or other function.

The lower part of FIG. 5 shows the effect of the modulator. While the input spectrum (bottom left) shows an essentially "white" distribution, the output spectrum has a predetermined shape. The shape is limited by the number of resolution elements in the dispersive element and the extent of the dispersion.

Figure 6:
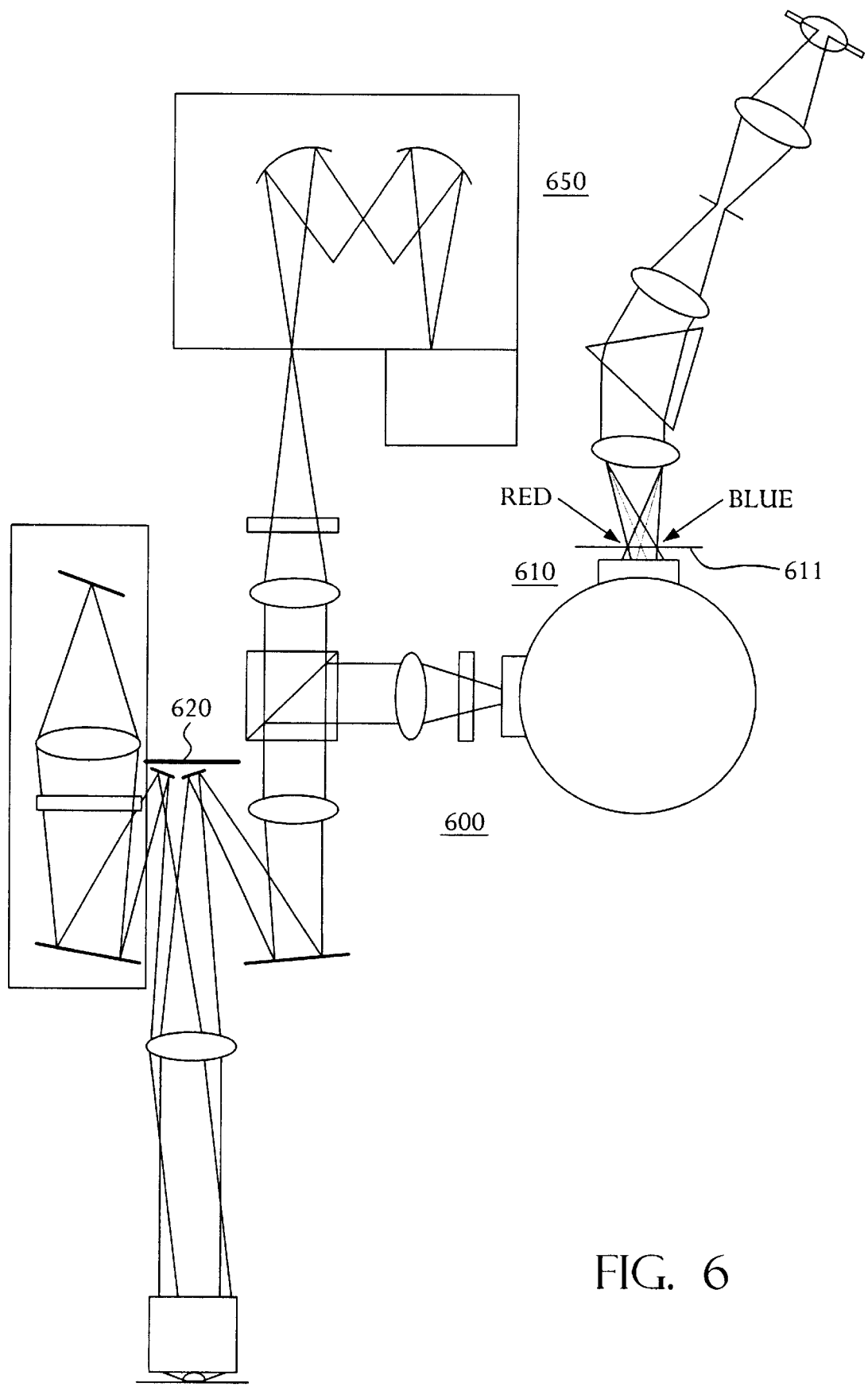
FIG. 6: a schematic view of a CSIS according to the invention incorporating both a confocal spectroscopic system (CSS) and a programmable light source (PLS)
Figure 7B:
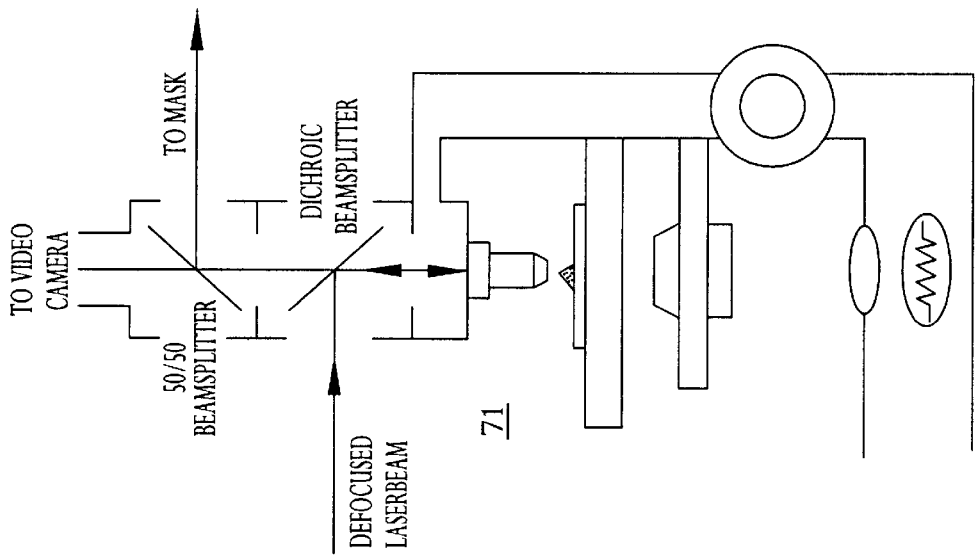
FIG. 7: a schematic view of a Hadamard transform Raman microscope using a non-programmable light modulator mask in the detection path only (prior art).
Figure 7A:
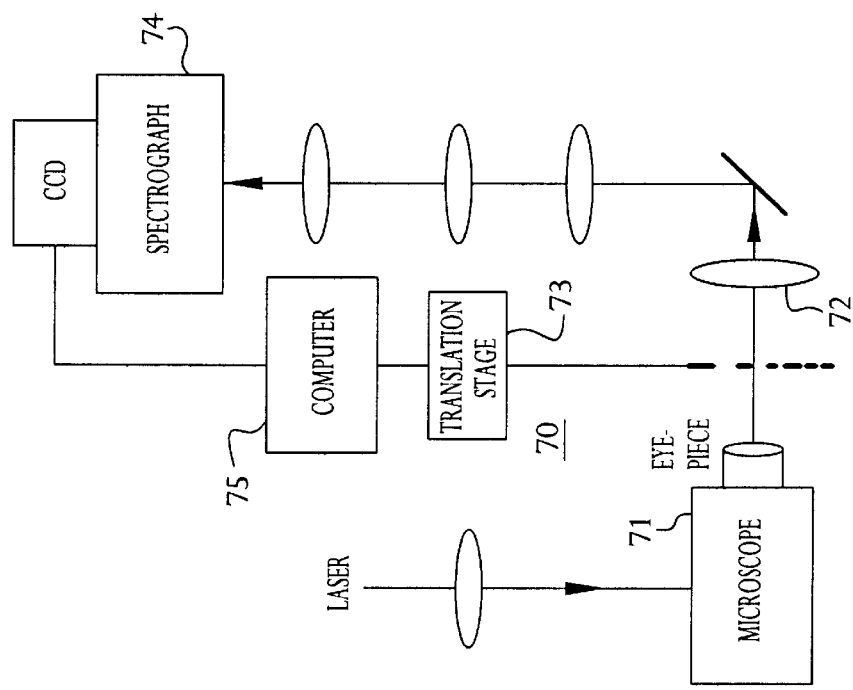

FIG. 6 shows a CSIS 600 combining both a confocal spectroscopic system (CSS) as described with reference to FIGS. 1, 3 or 4 and a wavelength progammable light source (PLS) as described with reference to FIG. 5. The object is illuminated through a plurality of coding mask modulators 611, 620. The CSIS contains as a light source 610 the PLS with a first spatial light modulator 611 adapted to select a fixed excitation wavelength or to modulate the excitation wavelength. In the latter case, the excitation wavelength is modulated according to an appropriate coding sequence for obtaining position and spectrally resolved excitation spectra, e. g. according to a Hadamard sequence. The CSS contains a second spatial light modulator 620 forming the illumination pattern as described above. Further details and the function of the CSIS 600 correspond to the above embodiments.

What is claimed is:

1. A confocal spectral imaging system comprising:
   light source means;
   light modulator means being arranged in a light path between said light source means and an object under investigation, said light modulator means comprising a two-dimensional array of light modulator elements, a group of which being arranged according to a predetermined illumination pattern to be formed in conjugate locations of said object, said light modulator elements forming an illumination aperture, wherein said light modulator means is controllable such that the illumination pattern is directed to time-dependent changing conjugate locations of the object, and analyzing means with spectrally dispersive elements and a detector camera, said analyzing means capable of collecting from said object spectrally resolved light with multiple wavelengths in a dispersed state, wherein a detection aperture is arranged in a light path between said object and said spectrally dispersive elements, and said illumination and detection apertures are placed in conjugate optical planes.

2. The system according to claim 1, wherein the light modulator elements are individually controllable such that the reflective, transmissive or diffractive properties thereof are changed.

3. The system according to claim 1, wherein the light modulator means are adapted to scan at least a part of the object according to a predetermined illumination pattern sequence.

4. The system according to claim 3, wherein the pattern sequence is selected from the group consisting of: a systematically shifting line or lines either spaced regularly, according to a pseudo-random sequence of finite length, according to a S-matrix type Hadamard sequence or randomly; regular dot lattices such as triangles, squares, rectangles, hexagons; random patterns or pseudo-random patterns of finite length based on so-called Walsch, Sylvester, Hadamard or Golay sequences; square or rectangular grids formed from intersecting line patterns; plane filling patterns being adapted to turn on the scanning laser microscopy elements an integral number of times when sequentially produced on the scanning laser microscopy; or a combination of the above pattern sequences.

5. The system according to claim 1, wherein the detection aperture is formed by the pattern shaped group of modulator elements so that the conjugate optical planes for illumination and detection coincide.

6. The system according to claim 1, wherein the entrance plane of the spectrally dispersive elements and the two-dimensional detector camera are arranged in conjugate optical planes.

7. The system according to claim 1, wherein the entrance plane of the spectrally dispersive elements is defined by the two-dimensional array of light modulator elements.

8. The system according to claim 1, being a part of a confocal programmable array microscope and further comprising full field detection means with a two-dimensional camera for collecting a conjugate or a non-conjugate microscopic image of the object.

9. The system according to claim 1, wherein the light source means contain a white light lamp and a fixed or tunable wavelength filter which comprises a spectrally dispersive element and another two-dimensional array of individually time-dependent controllable light modulator elements being illuminated with dispersed light from the spectrally dispersive element and providing a position selective transmittivity or reflectivity for producing light with a predetermined wavelength distribution.

10. The system according to claim 1, wherein the detection light is fluorescence, phosphorescence, reflected light or Raman scattered light emitted from the object.

11. A confocal spectral imaging method, comprising the steps of:

focusing illumination light from a light source means via light modulator means forming an illumination aperture and shaping a predetermined illumination pattern, to conjugate locations of an object under investigation, wherein said light modulator means comprises a two-dimensional array of light modulating elements which are controlled in a time-dependent fashion such that light modulating elements shaped according to the illumination aperture form an illumination pattern sequence, and collecting spectrally resolved light with multiple wavelengths in a dispersed state emitted from said object with analyzing means with a detection aperture, spectrally dispersive elements and a detector camera, wherein the illumination and detection apertures are placed in conjugate optical planes.

12. The method according to claim 11, wherein the light modulating elements are controlled such that at least a part of the object is scanned according to the predetermined pattern sequence, wherein the illumination patterns are selected from a group consisting of: a systematically shifting line or lines either spaced regularly, according to a pseudo-random sequence of finite length, according to a S-matrix type Hadamard sequence or randomly; regular dot lattices such as triangles, squares, rectangles, hexagons; random patterns or pseudo-random patterns of finite length based on so-called Walsch, Sylvester, Hadamard or Golay sequences; square or rectangular grids formed from intersecting line patterns; plane filling patterns being adapted to turn on the scanning laser microscopy elements an integral number of times when sequentially produced on the scanning laser microscopy; or a combination of the above pattern sequences.

13. The method according to claim 11, wherein simultaneously spectrally resolved conjugate and/or non-conjugate images of the object are collected with full field detector means.

14. The method according to claim 11, wherein the step of focusing light includes a wavelength selection.

15. The method according to claim 14, comprising the further step of:

deconvoluting the object with a deconvolution algorithm so as to reconstruct the spectrally resolved conjugate and non-conjugate images.

16. The method according to claim 11, comprising the further step of:

simultaneously initiating and monitoring photochemical reactions on a substrate, wherein the initiating includes the irradiation of predetermined substances with a suitable wavelength and the monitoring includes fluorescence measurements with the substances or the reaction products.

17. The method according to claim 11, wherein the method is used in process selected from the group consisting of:

investigations in the cell and tissue biology, analytical/biotechnological procedures, in-situ hybridization in genetic analysis, formation of an optical mask for position selective photochemical reactions, position selective spectroscopic measurements including excitation and emission spectra of one or more intrinsic or external fluorphores, lifetime measurements polarization measurements and/or absorptions measurements in a reflection mode, readout of biochemical arrays on chips, large scale surface inspections in the semiconductor industry, and optical recording and read-out.

18. The system according to claim 1, wherein said light source means comprises a programmable light source comprising a white or broad band light source, dispersion means for wavelength-selection of light from the light source, spatial light modulator means with a two-dimensional array of individually time-dependent controllable light modulator elements being illuminated with the dispersed light and providing a position selective transmittivity or reflectivity, so that a light output with a predetermined wavelength distribution passes the spatial light modulator means.

19. The system according to claim 18, further comprising a device for recombining the dispersed wavelengths being an integrating sphere, a lens system adapted for illumination in parallel mode, a matching set of dispersion optics, fiber optics, liquid light conduits, or scattering surfaces or materials.

20. The system according to claim 18, wherein the modulator elements are controllable with a transmission or reflection time dependent pattern corresponding to rows or columns of an S-type Hadamard coding matrix or with a predetermined time sweep.

21. The method according to claim 13 wherein the step of focusing light includes a wavelength selection.

22. The system according to claim 1 wherein said light source means comprises a programmable light source comprising a white or broad band light source, dispersion means for wavelength-selection of light from the light source, spacial light modulator means with a two-dimensional array of individually time-dependent controllable light modulator elements being illuminated with the dispersed light and providing a position selective transmittivity or reflectivity, so that a light output with a predetermined wavelength distribution passes the spatial light modulator means.

23. The system according to claim 22 wherein said programmable light source further comprises a device for recombining the disbursed wavelengths being an integrating sphere, a lens system adapted for illumination in parallel mode (Kohler-type illumination), a matching set of dispersion optics, fiber optics, liquid light conduits, or scattering surfaces or materials.

24. The system according to claim 22 wherein the modulator elements are controllable with a transmission or reflection time dependent pattern corresponding to rows or columns of an S-type Hadamard coding matrix or with a predetermined time sweep.

25. A spectral imaging system comprising:
   a light source;
   a light modulation system disposed in an illumination path between said light source and an object under investigation; and,
   a spectral analyzer disposed in a detection path, said detection path including said object and being different from said illumination path, wherein said system allows simultaneous detection of multiple wavelengths.

26. The spectral imaging system according to claim 25, wherein said light modulation system comprises a two-dimensional array of light modulator elements, said light modulator elements forming an illumination aperture, a group of said light modulator elements being arranged according to a predetermined illumination pattern.

27. The spectral imaging system according to claim 25, wherein said analyzer comprises a set of spectrally dispersive elements and a detector camera, said analyzer collecting from said object spectrally resolved light with multiple wavelengths in a dispersed state, and wherein a detection aperture is arranged in a light path between said object and said spectrally dispersive elements.

28. The spectral imaging system according to claim 25, wherein said analyzer provides spectrally resolved detection.

29. A method for spectral imaging, comprising the steps of:
   focusing illumination light from a light source on a subject via a light modulation system, said light modulation system forming an illumination aperture and shaping a predetermined illumination pattern, the light modulation system comprising a two-dimensional array of light modulation elements; and,
   collecting spectrally resolved light with multiple wavelengths in a dispersed state emitted from said object with a spectral analyzer.

* * * * *

UNITED STATES PATENT AND TRADEMARK OFFICE
CERTIFICATE OF CORRECTION

PATENT NO.   : 6,128,077
DATED        : October 3, 2000
INVENTOR(S)  : Jovin et al.

It is certified that error appears in the above-identified patent and that said Letters Patent is hereby corrected as shown below:

On the title page item [73],

--Assignee: Max-Planck-Gesellschaft zur Förderung der Wissenschaften e.V., of München, Germany--

Signed and Sealed this

Twenty-fourth Day of April, 2001

Attest:

NICHOLAS P. GODICI

*Attesting Officer*     *Acting Director of the United States Patent and Trademark Office*